(12) United States Patent
Rust

(10) Patent No.: US 9,541,199 B2
(45) Date of Patent: Jan. 10, 2017

(54) SEAL FAILURE DETECTION SYSTEMS AND RELATED METHODS

(75) Inventor: Steve Rust, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 23 days.

(21) Appl. No.: 13/456,143

(22) Filed: Apr. 25, 2012

(65) Prior Publication Data

US 2012/0267858 A1 Oct. 25, 2012

Related U.S. Application Data

(60) Provisional application No. 61/478,826, filed on Apr. 25, 2011.

(51) Int. Cl.
*F16J 3/00* (2006.01)
*F16J 15/06* (2006.01)
*F16J 15/32* (2016.01)

(52) U.S. Cl.
CPC ........... *F16J 15/064* (2013.01); *F16J 15/3236* (2013.01); *F16J 15/3296* (2013.01)

(58) Field of Classification Search
CPC ..... F16J 15/326; F16J 15/3296; F16J 15/3288
USPC ............... 277/350, 351, 550, 551, 562, 564, 568,277/569, 317, 321
See application file for complete search history.

(56) References Cited

U.S. PATENT DOCUMENTS

| | | | | |
|---|---|---|---|---|
| 3,114,561 A | * | 12/1963 | Creath | F16J 15/121 277/555 |
| 4,497,493 A | * | 2/1985 | Sall et al. | 277/306 |
| 5,246,235 A | * | 9/1993 | Heinzen | 277/321 |
| 5,540,448 A | * | 7/1996 | Heinzen | F16J 15/3296 116/208 |
| 6,003,872 A | * | 12/1999 | Nord | 277/317 |
| 6,082,737 A | * | 7/2000 | Williamson et al. | 277/317 |
| 2003/0184018 A1 | * | 10/2003 | Upton | F16J 15/004 277/318 |
| 2009/0146379 A1 | * | 6/2009 | Foster | F16J 15/3236 277/307 |
| 2009/0289418 A1 | * | 11/2009 | Cook | 277/309 |
| 2010/0276894 A1 | * | 11/2010 | Jin et al. | 277/500 |

* cited by examiner

*Primary Examiner* — Kristina Fulton
*Assistant Examiner* — Nathan Cumar
(74) *Attorney, Agent, or Firm* — Klein, O'Neill & Singh, LLP

(57) ABSTRACT

A seal failure prediction system consisting of a seal component and a member conveniently placed; such member, which may be in the form of a strip, a set of wires, or a single wire, generating a characteristic electrical or audible signal when the seal component wears a certain amount.

11 Claims, 15 Drawing Sheets

SEAL FAILURE DETECTION SYSTEMS AND RELATED METHODS

CROSS-REFERENCE TO RELATED APPLICATION

This is a regular utility of provisional application Ser. No. 61/478,826, filed Apr. 25, 2011, the contents of which are expressly incorporated herein by reference.

FIELD OF ART

The present disclosure is directed to seal failure prediction devices, systems and related methods and pertain to failure warning, detection, and/or prediction devices and systems for seal applications, such as for predicting leakage for a seal assembly sealing against a dynamic shaft.

BACKGROUND

The failure or malfunction of a seal, manifested in excessive leakage, may have dramatic consequences depending on the nature or functionality of the device or system where sealing is provided. Predicting such failure or malfunction allows the appropriate corrective actions, such as replacement or reinforcement of the seal, to be taken on time, thus avoiding any negative effect on the device or system when trying to repair during an emergency.

Most seal failures in rotary or reciprocating applications occur due to seal lip failure. The ability to detect major seal wear as a warning before failure occurs can be very valuable, especially in critical applications where seal failure would result in major damages, delay in operation, disrupt operation, or cause expensive repair.

SUMMARY

A seal failure prediction system offers the possibility to predict the failure or malfunction of a seal by means of a member conveniently placed within the sealing component, which can generate a characteristic electrical or audible signal when a certain level of seal degradation is reached.

In one example, a seal failure prediction system is composed of a sealing component and a detection member that can indicate imminent failure of the sealing component. This feature can be accomplished by means of the detection member, which generates a characteristic electrical or audible signal when the sealing component is worn to a certain amount, has worn by a certain amount, or both. Such member may be a strip, a set of wires or a single wire, and its properties can depend on the type of signal to be generated, i.e., electrical or audible.

Another device, assembly, and method of the present application include using or incorporating means for completing a circuit, said means can include a bearing or bearings that support the shaft.

Another feature of the present device, assembly, and method is the use of an audible alarm, a light, or other indicia for indicating when a circuit is closed, such as when the strip touches the shaft.

Yet another feature of the present device, assembly, and method is the use of a second seal assembly (not shown), which is spaced from the first assembly with the movable strip and forms a constant electrical contact between the shaft and the circuit. When the seal with the contact strip touches the shaft after the primary seal lip wears, a closed circuit is formed.

In still yet another feature of the present device, assembly, and method, a double seal is used in which a single seal has two contact strips. At least one of the contact strips forms a constant contact with the shaft and the other contact strip makes contact with the shaft only after sufficient seal wear. In another embodiment, the constant contact is formed through a conductive material that is integrated into the seal or seal assembly.

Thus, a feature of the present system, device, and method is understood to include a seal lip for sealing against a dynamic surface that acts like a switch for completing the circuit upon wear of the seal lip. The seal lip is thus analogous to a "wear" switch as opposed to a "throw" switch that can be toggled.

A still further feature of the present disclosure is a system for predicting or warning of probable, potential, or actual seal failure by forming a circuit with a movable shaft.

An aspect of the present device includes a seal assembly having a conductive contact element for forming an electrical contact with a movable shaft.

A still further aspect of the present device is a seal assembly having a mechanical switch or contact for causing an audible sound after sufficient seal wear.

The present application is further directed at a method for predicting or warning of probable, potential, or actual seal failure by forming a circuit between a seal or seal assembly with a movable shaft.

A still further aspect of the present disclosure is a seal failure prediction system comprising: a seal element comprising an outer flange, a center channel section, and an inner flange comprising a seal lip; an electrically conductive strip disposed in or adjacent the center channel section of the seal element and having an outer perimeter exposed and co-planar with an exterior surface of the outer flange and having an inner perimeter; wherein the outer perimeter of the electrically conductive strip is configured to contact a first sealing member and the inner perimeter is configured to contact a second sealing member to provide electrical communication between the first sealing member and the second sealing member.

In some examples, the seal failure prediction system can further comprises a canted coil spring disposed in a cavity defined by the inner flange, the outer flange, and the center channel section of the seal element.

In some examples, the seal failure prediction system wherein the seal elements annular and has an annular bore defined by the inner flange.

A still further aspect of the present description is a method for predicting seal failure comprising the steps of providing a conductive strip in a seal assembly and closing a circuit when a seal lip on a seal element of the seal assembly wears an amount equal to a clearance gap.

The method wherein the conductive strip is located between a seal element and a back-up ring.

The method wherein the conductive strip is embedded into the seal element.

In other examples, a seal failure prediction system is provided comprising: a seal element comprising an outer flange, a center channel section, and an inner flange comprising a seal lip; a canted coil spring disposed in a cavity defined by the inner and outer flanges and the center channel section of the seal element; a housing having the seal element disposed therein; an electrically conductive strip disposed in or adjacent the center channel section of the seal element and having an outer perimeter exposed and co-planar with an exterior surface of the outer flange and having an inner perimeter; wherein the outer perimeter of the strip contacts the housing and the inner perimeter of the strip contacts a shaft.

In some examples, the seal failure prediction can further comprise a back-up ring positioned in the housing.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

Figure 1:
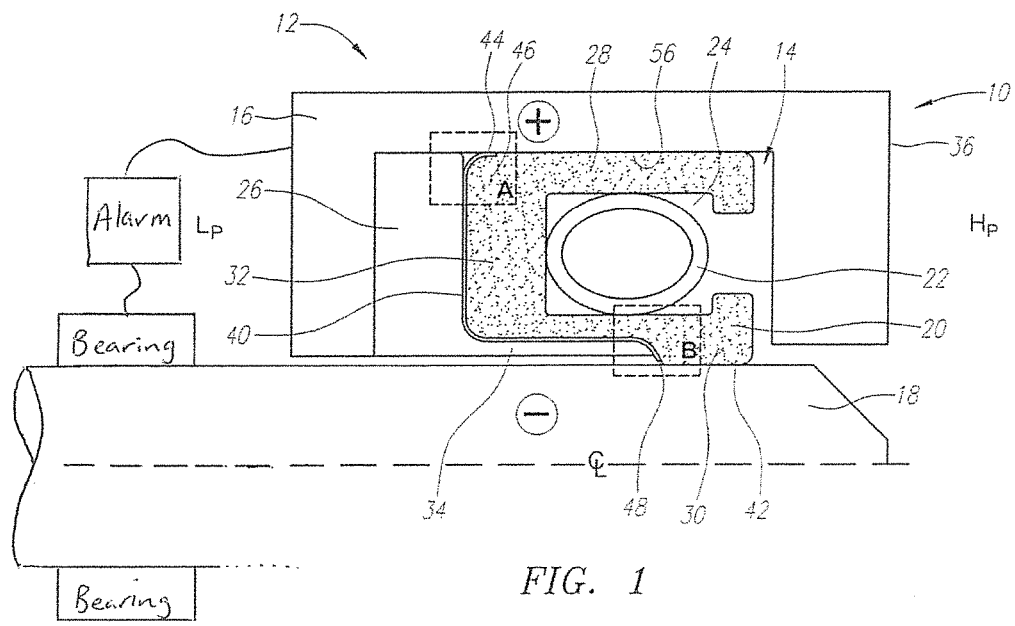
FIG. 1 is across-sectional view of a seal failure detection or prediction system mounted over a shaft.

The detailed description set forth below in connection with the appended drawings is intended as a description of the presently preferred embodiments of seal failure prediction devices, systems and related methods provided in accordance with aspects of the present disclosure and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As FIG. 1 illustrates a cross section of a seal failure prediction system 10 provided in accordance with aspects of the present disclosure. The prediction system 10 comprises a seal failure prediction assembly 12, or simply seal assembly 12, mounted in a seal chamber 14, which is defined by a housing 16 and a shaft 18. The housing 16 and the shaft 18 are typically made from metallic materials, which are preferably also electrically conductive. The seal assembly 12 comprises a seal element 20 having an energizer 22 located in a holding cavity 24. In one example, the energizer is a canted coil spring. In another example, the energizer is a compressible elastomer. Exemplary springs include those disclosed in U.S. Pat. Nos. 4,655,462; 4,826,144; 4,876,781; and 4,907,788. The combination energizer 22 and seal element 20 may be referred to as a spring energized seal. The combination seal assembly 12 and housing 16 may be packaged and used as a secondary seal to back up a primary seal (not shown). Alternatively, the detection system 10 may be used as a standalone combination primary seal and detection system. Furthermore, the system 10 may be understood to be annular in configuration and is generally symmetrical about the shaft centerline ℄. In another embodiment, the system, is semi-spherical.

As shown, the seal assembly 12 further includes a back-up ring 26 typically made from a substantially more rigid material than the material used to form the seal element. The seal element 20 has an outer extending flange 28, an inside extending flange 30 located closer to the shaft 18, and a center channel section 32, which collectively define the holding cavity 24 for receiving the canted coil spring 22. The back-up ring 26 has a similar inside extending flange 34 for supporting the seal element's inside extending flange 30, such as to prevent the seal's inside extending flange 30 from being extruded or pushed due to pressure from the higher pressure $H_P$ region to the low pressure region $L_P$. In an alternative embodiment, a retaining ring (not shown) is incorporated for mounting the seal assembly to the housing 16, which typically only has one outside radial end wall 32 and not an inner end wall 34, which are so termed relative to the pressure regions. In another embodiment, the inner end wall 34 is separately formed and fastened or secured to the housing 16, such as by way of detents or fastening means or screw s or combinations of thereof. Alternatively, the seal assembly 12 is axially rotated so that the inside and outer extending flanges 28, 30 face the low pressure region $L_P$. Exemplary seal assemblies are disclosed in co-pending application Ser. No. 12/329,405, filed Dec. 5, 2008; Ser. No. 12/465,185, filed May 13, 2009 and in U.S. Pat. Nos. 7,210,398; 6,641,141; 6,264,205; 6,161,838; 6,050,572; and 5,992,856, the contents of each of which are expressly incorporated herein by reference.

FIG. 1 further shows the seal assembly 12 incorporating a contact strip, a detection strip, a wear strip, or strip 40 of electrically conductive metallic material, such as a copper or copper alloy strip, located between the seal element 20 and the rigid back-up ring 26. The seal assembly 12, and in particular the seal element 20, is shown in its initial non-worn condition, which shows the back-up ring 26 spaced from the shaft while the seal lip 42 forms a line contact with the shaft 18 to seal against the shaft and prevent leakage at the interface thereof. As shown, the outer perimeter or outer end 44 of the strip 40 is pressed against the housing 16 and appropriately shaped or formed to ensure an effective and uniform electrical contact between the detection strip 40 and the housing 16 which is also electrically conductive. In one example, the outer perimeter 44 is curved in the direction of the high pressure region $H_P$ and is form-fitting around the outer edge 46 of the seal element 20 so that at least a portion of the outer perimeter 44 is exposed and in direct contact with the housing 16. In some embodiments, the outer perimeter 44 is pressed in the opposite direction, i.e., is formed fitting over the back-up ring and points in the direction of the low pressure region $L_P$. In yet other embodiments, the strip 40 has an annular configuration and is symmetrical about the shaft centerline $\textcircled{L}$. In other embodiments, the strip 40 is provided on one side of the shaft centerline only $\textcircled{L}$, i.e., the strip is not symmetrical about the shaft centerline. For example, the strip 40 may embody a wire having a generally shape cross-section as shown and comprises a depth, i.e., thickness, that projects into the drawing of FIG. 1. In some embodiments, the depth may be an equivalent of a 10 gauge to a 22 gauge wire. In other embodiments, the strip 40 may embody a structure that is similar to a fan with a projection 47 from 10 degrees to about 180 degrees of the arc circle of the shaft.

Figure 1A:
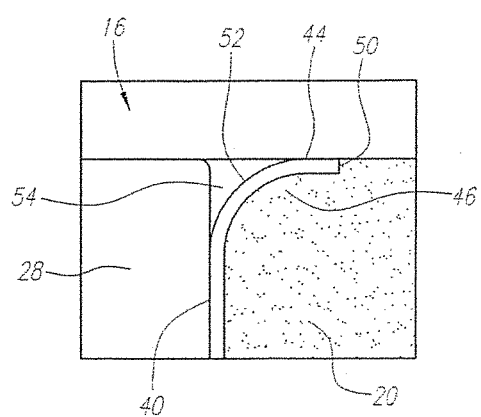
FIGS. 1A and 1B are exploded views of seal sections of FIG. 1.
Figure 1B:
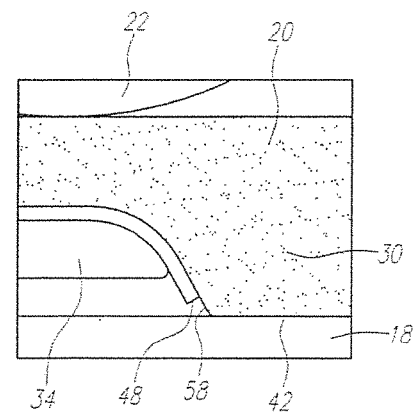

FIGS. 1A and 1B are enlarged views of the seal assembly 12, showing regions of the seal assembly 12 at the outer perimeter 44 and the inner perimeter 48 of the strip 40, respectively. With reference initially to FIG. 1A, the outer perimeter 44 is shown formed over the outer edge 46 of the seal element 20, which is located adjacent a shoulder 50 and a ledge 52 that together defined a gap or channel 54 for accommodating the strip. As configured, the outer perimeter 44 from a line contact with the interior surface 56 of the housing 16.

FIG. 1B shows the inner perimeter 48 of the strip 40 relative to the shaft 18. As shown, the inner perimeter 48 is spaced from the shaft 18 by a gap 58, which may viewed or considered a clearance gap or working gap and represents a distance or clearance that the seal lip 42 can wear before the inner perimeter 48 of the strip 40 contacts the shaft 18. In one example, as the seal lip 42 wears, an end edge of the inner perimeter 48 contacts the shaft, which is facilitated by the spring 22 biasing the inner flange 30 of the seal element 20, the strip 40, and the inner flange 34 of the back-up ring 26 inwardly towards the shaft. The spring 22 is also understood to bias the outer flange 28 of the seal element 20 and, if incorporated, the retaining ring (not shown) outwardly towards the housing 16.

Figure 1C:
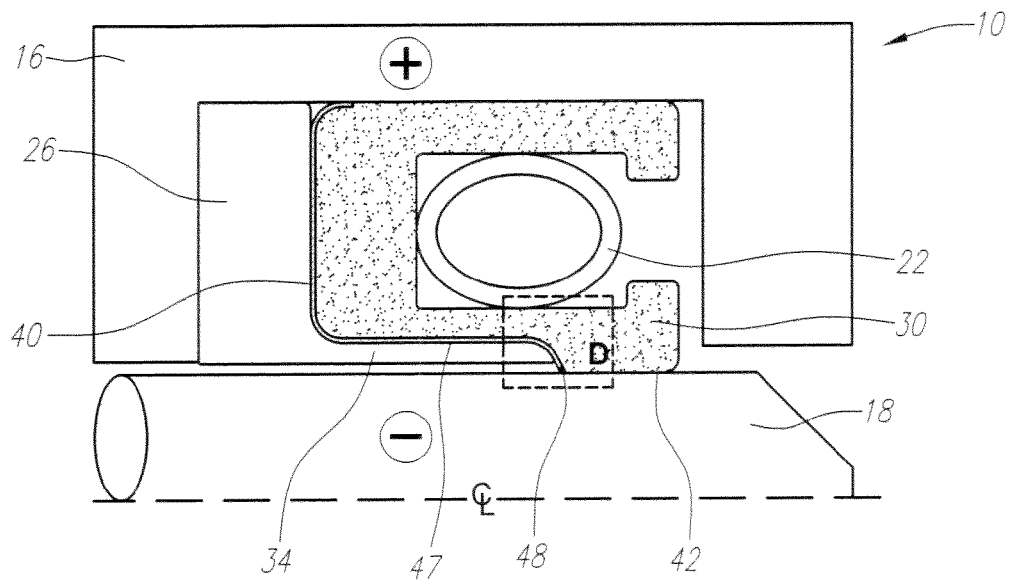
FIG. 1C is a cross-sectional view of the system of FIG. 1 shown in a partially worn state.

FIG. 1C illustrates a cross section of the seal failure prediction system 10 of FIG. 1. The seal failure prediction system 10 is shown with the seal element 20 in its near failure condition, i.e., worn, but still seals against the shaft 18. The seal against the shaft 18 is still maintained due, at least in part, to the spring 22 biasing the inner flange 30 and the seal lip 42 against the shaft. In this configuration or state, the inner flange 34 of the back-up ring 26 is spaced from the shaft, i.e., not in contact with the shaft. However, the inner perimeter 48 of the strip 40 is now in contact with the shaft 18 as the wear on the seal lip 42 wears away the clearance gap 58 (FIG. 1B). If the strip 40 functions as a switch, the wearing on the seal lip 42 causes the strip 40 to now close the circuit by simultaneously contacting both the housing 16 and the shaft 18 and allowing electrical communication to flow between the two. If the housing is considered a positive terminal "+" and the shaft a negative terminal "−", the wearing of the seal lip 42 by an amount that equals to the clearance gap 58 (FIG. 1B) closes the electrical circuit between the positive and the negative terminals. The circuit may further be connected to an alarm system, such as to a light, an audible alarm, or other warning signals for alerting the operator of the seal wear and impending seal failure. The circuit may further be incorporated in an application for tracking, trending, or monitoring how the seal operates. The system 10 therefore assists in predicting seal failure by alerting a user or operator that the seal lip has worn a sufficient amount when the circuit closes and an alarm or signal is produced.

Figure 1D:
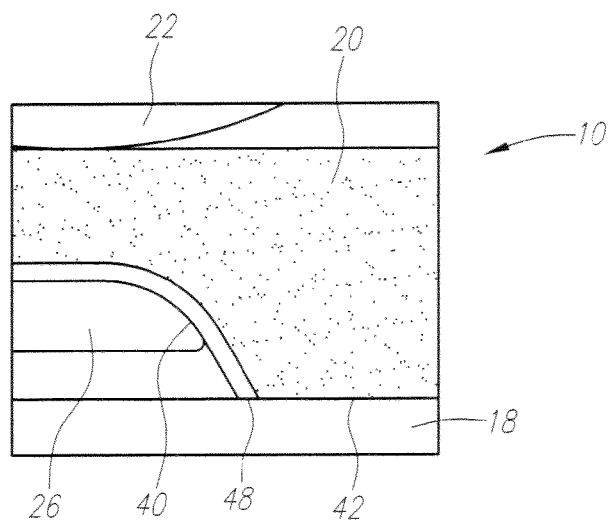
FIG. 1D is an exploded view of a seal section of FIG. 1C.

FIG. 1D is an enlarged view of FIG. 1C at the area of the seal lip 42 and the inner perimeter 48 of the strip 40. As shown, the strip 40 is in contact with the shaft 18 with the back-up ring 26 still spaced from the shaft.

Thus, an aspect of the present disclosure is understood to include a seal failure detection comprising a conductive strip that closes a circuit between a housing and a shaft after sufficient wear on the seal lip of a seal element. In one example, the strip is spaced from the shaft when the seal element is first installed by a clearance gap and wherein the clearance gap disappears after sufficient wear on the seal element to permit circuit closure. A further aspect of the present description is a method for predicting seal failure by providing a conductive strip in a seal assembly and closing a circuit when the seal lip on a seal element wears an amount equal to a clearance gap. In one example, the conductive strip is located between a seal element and a back-up ring. In another example, the conductive strip is embedded into the seal element. In still other examples, the conductive strip is a metallic wire having a size of between a 22 gauge to 10 gauge. In other examples, the size is thicker than a 10 gauge wire.

Figure 2:
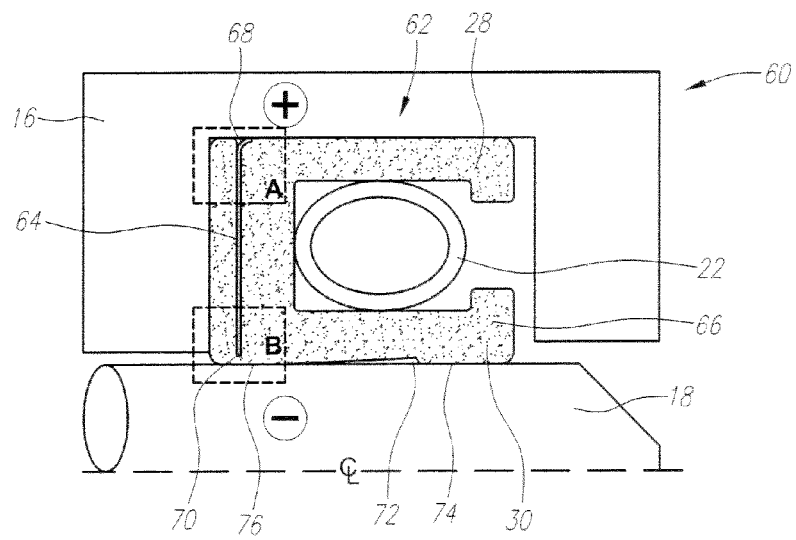
FIG. 2 is a cross-sectional view of a seal failure detection or prediction system mounted over a shaft according to alternative aspects of the present disclosure.

FIG. 2 shows a cross section of a seal failure prediction system 60 provided in accordance with alternative aspects of the present disclosure. The present system 60 has many features that are similar with the system 10 of FIGS. 1A-1E. Thus, unless the context indicates otherwise, only features that differ will be emphasized herein.

The system 60 comprises a seal assembly 62 mounted directly to a housing 16 without a backup ring, such as for use in relatively low pressure applications. The seal assembly 62 comprises a detection, contact, or warning strip 64 that is embedded directly into the seal element 66. For example, the warning strip 64 may be co-molded with the seal element 66 with the seal element being made from an elastomeric material such as silicone. Buna N, nitrile, fluorosilicones, PTFE, elastomers, etc. Also, certain types of plastics that have the properties of elastomers, such as being elastic, can be used due to their high coefficient of friction, their operating temperature, etc. In an alternative embodiment, a torroid shape backup ring (not shown) may be placed between the housing and the seal element to resist extrusion from the high pressure region to the low pressure region.

As shown, the outer perimeter or edge 68 of the strip 64 is pressed against the housing 16 and appropriately shaped to ensure an effective electrical contact between the outer edge 68 and the housing. Along the inside adjacent the shaft 18, the inner edge 70 of the strip is embedded and located completely within the inside flange 30 of the seal element 66, which has a curved or recessed edge 72 separating the inside flange 30 into a first seal lip section 74 and a second seal lip section 76.

As with the embodiment of FIG. 1, when the seal element 66 shown in FIG. 2 is in its un-worn condition, such as when first installed, the inner edge 70 of the strip 64 is spaced from, i.e., not contact, the shaft 18. Thus, if the housing 16 represents a positive terminal and the shaft 18 a negative terminal, the circuit is not closed due to the inner edge 70 of the strip being spaced from the shaft 18.

Figure 2A:
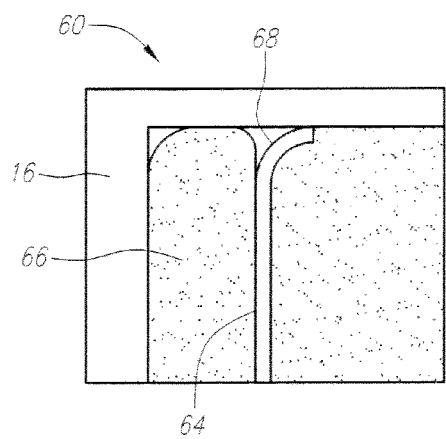
FIGS. 2A and 2B are exploded views of seal sections of FIG. 2.
Figure 2B:
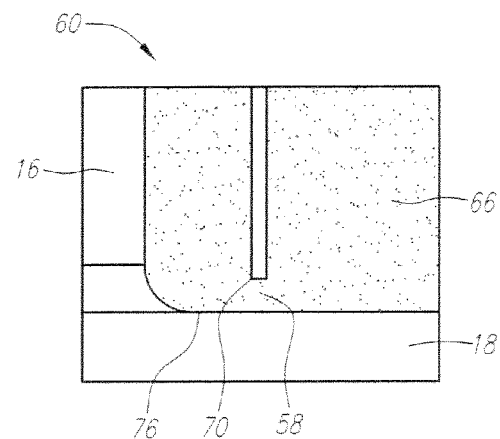

FIG. 2A and FIG. 2B are enlarged views of the outer edge 68 and the inner edge 70 of FIG. 2, respectively. As clearly shown in FIG. 2A, the outer edge 68 is curved to ensure good electrical contact with the housing 16. Conversely, the inner edge 70 is clearly shown spaced from the shaft 18 by a clearance gap or working gap 58, which in the present embodiment represents a thickness section of the seal element 66 at the second seal lip section 76. As the thickness of the seal lip 76 wears by an amount that equals to the clearance gap 58, the inner edge 70 of the strip will be exposed and contact the shaft 18 to close the circuit, as further discussed below.

Figure 2C:
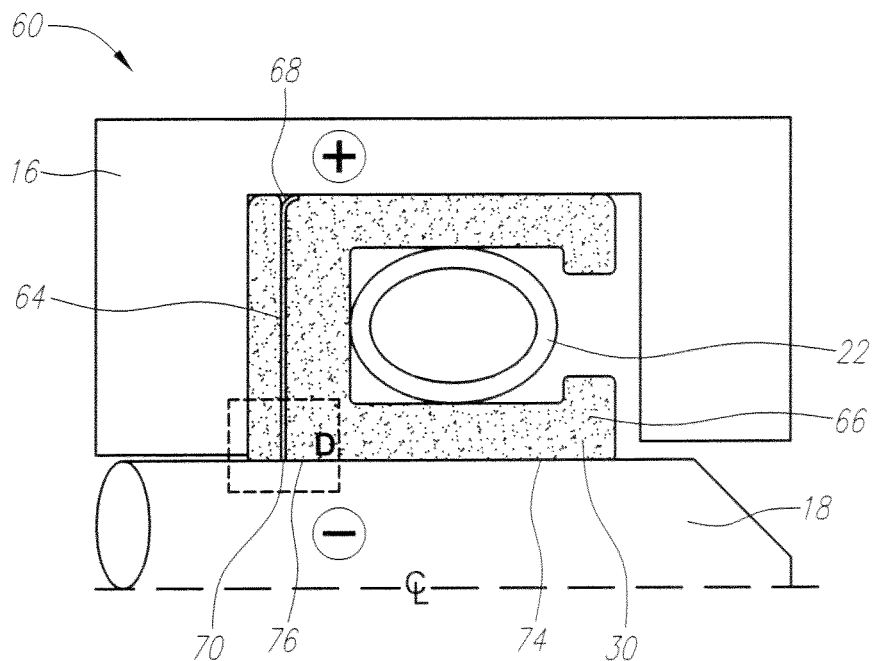
FIG. 2C is a cross-sectional view of the system of FIG. 2 shown in a partially worn state.

FIG. 2C illustrates across section of the seal failure prediction system 60 of FIG. 2. The seal failure prediction system 60 is shown with the seal element 66 in its near failure condition, i.e., worn, but still seals against the shaft 18. The seal against the shaft 18 is still maintained due, at least in part, to the spring 22 biasing the inner flange 30 and the seal lip against the shaft. As the seal is partially worn, the recessed edge 72 disappears and the first 74 and second 76 seal lips merge into a single seal lip or seal edge. In this configuration or state, the inner perimeter 70 of the strip 64 is now in contact with the shaft 18 as the wear on the seal element 66 wears away the clearance gap 58 (FIG. 2B). If the strip 64 functions as a switch, the wearing on the seal lip causes the strip 64 to now close the circuit by simultaneously contacting both the housing 16 and the shaft 18 and allowing electrical current to flow between the two. The circuit may further be connected to an alarm system, such as to a light, an audible alarm, or other warning signals for alerting the operator of the seal wear and impending seal failure. The system 60 therefore assists in predicting seal failure by alerting a user or operator that the seal lip has worn a sufficient amount when the circuit closes and an alarm or signal is produced. Alternatively or in addition thereto, the circuit may be connected to an application for trending, tracking, or monitoring the seal performance.

Figure 2D:
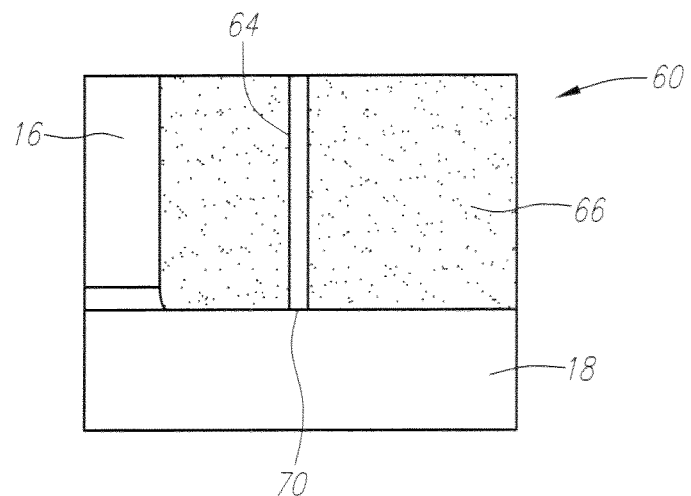
FIG. 2D is an exploded view of a seal section of FIG. 2C.

FIG. 2D shows the area of the seal lip 76 and the inner perimeter 70 of the strip 64 of FIG. 2C. As shown, the strip 64 is in contact with the shaft 18.

Thus, aspects of the present device, system, and method are understood to include a strip that is embedded into a seal element but with one end directly contacting a first sealing component, such as a metallic housing, and a second end recessed within the seal element. In a particular embodiment, the recessed second end is sealed by the material of the seal element. As the seal element wears, the second end of the strip is exposed and contacts a second sealing component, such as a shaft. A further aspect of the present description is a method for forming a circuit between a first sealing component and a second component by wearing away part of a seal element and exposing a strip. The method further comprising contacting the strip with the first sealing component and contacting the second component with the now exposed part of the strip. In particular embodiments, the first sealing component is a metallic housing and the second sealing component is a metallic shaft.

Figure 3:
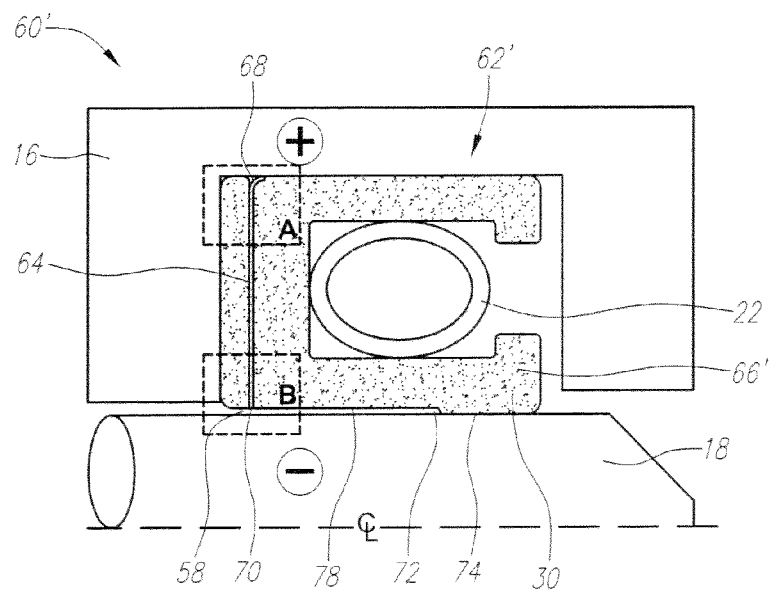
FIG. 3 is a cross-sectional view of a seal failure detection or prediction system mounted over a shaft according to alternative aspects of the present disclosure.

FIG. 3 shows a seal failure prediction system 60' provided in accordance with further aspects of the present disclosure. The prediction system 60' is similar to the prediction system 60 of FIG. 2 with the following exceptions or modifications. In the present embodiment, a second lip is not incorporated and the recessed edge 72 on the inner flange 30 of the seal element 66' extends to the housing 16. Thus, while the strip 64 is still embedded in the seal element 66', the inner edge 70 of the strip 64 is generally flushed or only slightly recessed from the exterior surface 78 of the inner flange 30.

Figure 3A:
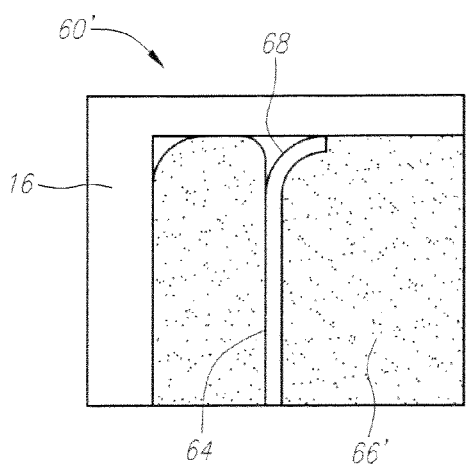
FIGS. 3A and 3B are exploded views of seal sections of FIG. 3.
Figure 3B:
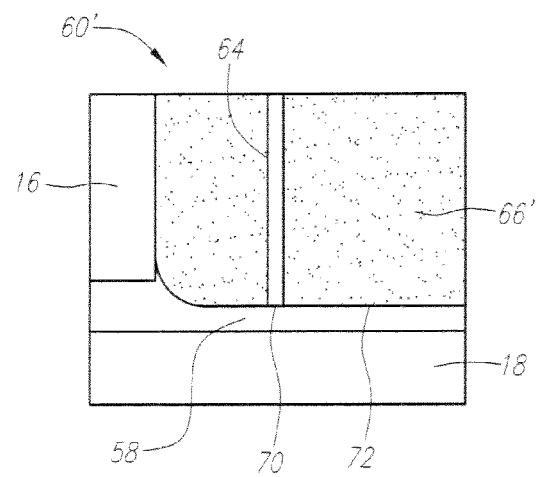

FIG. 3A and FIG. 3B are enlarged views of the outer edge 68 and the inner edge 70 of FIG. 3, respectively. As clearly shown in FIG. 3A, the outer edge 68 is curved to ensure good electrical contact with the housing 16. Conversely, the inner edge 70 is clearly shown spaced from the shaft 18 by a clearance gap or working gap 58, which in the present embodiment represents a seal thickness that the seal lip 74 has to wear before the inner edge 70 contacts the shaft 18.

Figure 3C:
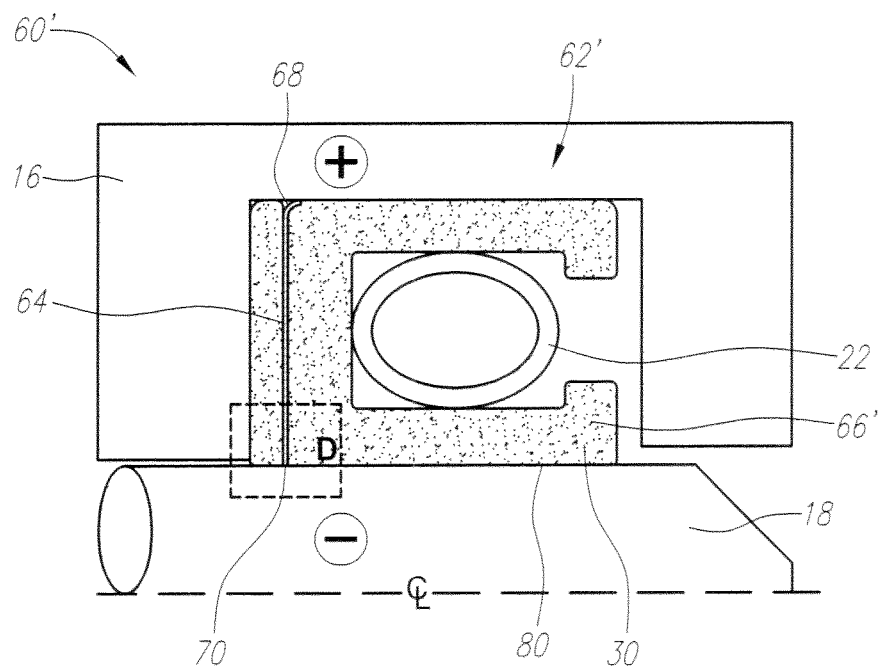
FIG. 3C is a cross-sectional view of the system of FIG. 3 shown in a partially worn state.

FIG. 3C illustrates a cross section of the seal failure prediction system 60' of FIG. 3. The seal failure prediction system 60' is shown with the seal element 66' in its near failure condition, i.e., worn, but still seals against the shaft 18. The seal against the shaft 18 is still maintained due, at least in part, to the spring 22 biasing the inner flange 30 and the seal lip and the worn seal edge 80 against the shaft. In this configuration or state, the inner perimeter 70 of the strip 64 is now in contact with the shaft 18. If the strip 64 functions as a switch, the wearing on the seal lip 74 causes the strip 64 to now close the circuit by simultaneously contacting both the housing 16 and the shaft 18 and allowing electrical communication or electrical flow to flow between the two. The circuit may further be connected to an alarm system, such as to a light, an audible alarm, or other warning signals for alerting the operator of the seal wear and impending seal failure. The system 60' therefore assists in predicting seal failure by alerting a user or operator that the seal lip has worn a sufficient amount when the circuit closes and an alarm or signal is produced.

Figure 3D:
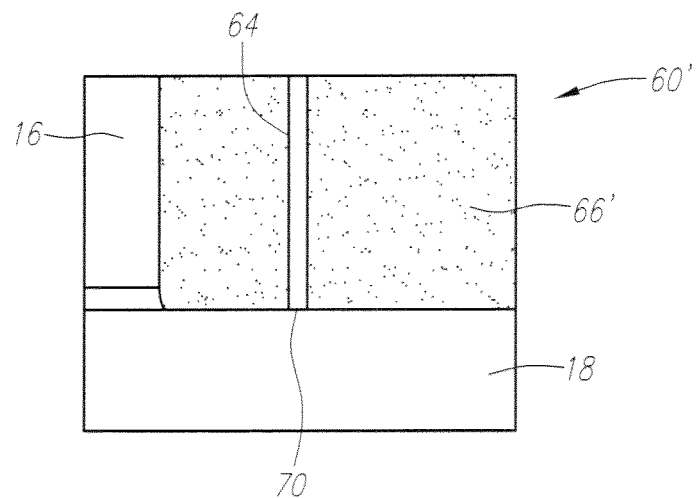
FIG. 3D is an exploded view of a seal section of FIG. 3C.

FIG. 3D shows an enlarged view of the area of the seal lip 80 and the inner perimeter 70 of the strip 64 of FIG. 3C. As shown, the strip 64 is in contact with the shaft 18.

Figure 4:
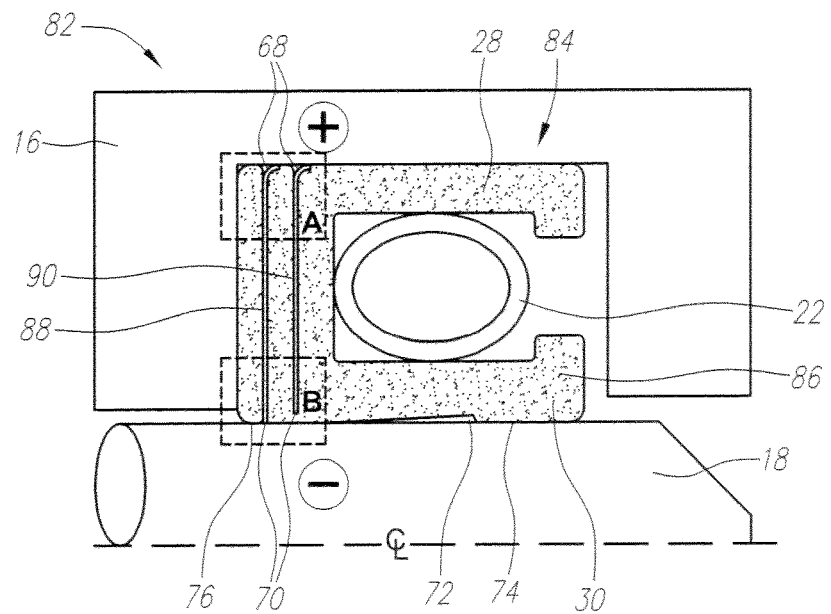
FIG. 4 is a cross-sectional view of a seal failure detection or prediction system mounted over a shaft according to alternative aspects of the present disclosure.

FIG. 4 shows a cross section of a seal failure prediction system 82 provided in accordance with alternative aspects of the present disclosure. The present system 82 comprises a seal assembly 84 mounted directly to a housing 16 without a backup ring, such as for use in relatively low pressure applications. The seal assembly 84 comprises a seal element 86 comprising a first detection, contact, or warning strip 88 and a second detection, contact or warning strip 90 embedded directly into the seal element 86, similar to the embodiment of FIGS. 2 and 3. As shown, the outer perimeters or edges 68 of both strips 88, 90 are pressed against the housing 16 and appropriately shaped to ensure effective electrical contacts between the outer edges 68 and the housing. Along the inside adjacent the shaft 18, the inner edge 70 of the first strip 88 is allowed to terminate along the second seal lip 76 and contact the shaft 18. Thus, the first strip 88, by contacting both the housing 16 and the shaft 18, closes a circuit between the two. This first closed circuit may be used, for example, to verify operation of the detection system 82—that it is running as verified by the closed circuit. The first closed circuit may also be used as a redundant system so that an alarm only sounds when the second circuit is completed or closed in addition to the first circuit, as further discussed below.

Also shown in FIG. 4 is the inner edge 70 of the second strip 90 being embedded but located completely within the inside flange 30 of the seal element 86, which has a curved or recessed edge 72 separating the inside flange 30 into a first seal lip section 74 and a second seal lip section 76. As with the embodiment of FIG. 2, when the seal element 86 shown in FIG. 4 is in its un-worn condition, such as when first assembled, the inner edge 70 of the second strip 90 is spaced from, i.e., not contact, the shaft 18. Thus, if the housing 16 represents a positive terminal and the shaft 18 a negative terminal, the second circuit with the second strip 90 is not closed due to the inner edge 70 of the strip being spaced from the shaft 18.

Figure 4A:
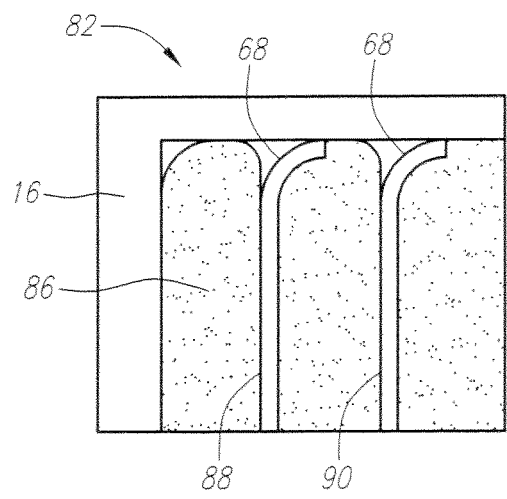
FIGS. 4A and 4B are exploded views of seal sections of FIG. 4.
Figure 4B:
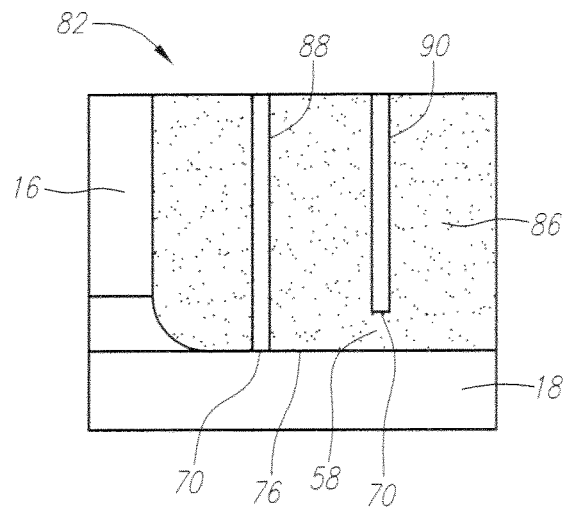

FIG. 4A and FIG. 4B are enlarged views of the outer edges 68 and the inner edges 70 of FIG. 4, respectively. As clearly shown in FIG. 4A, the outer edges 68 are curved to ensure good electrical contact with the housing 16. Conversely, only the inner edge 70 of the first strip 88 is shown in contact with the shaft 18 while the inner edge 70 of the second strip 90 is shown spaced from the shaft 18 by a clearance gap or working gap 58, as shown in FIG. 4B. The working gap 58 in the present embodiment represents a thickness section of the seal element 86 at the second seal lip section 76. As the thickness of the second seal lip 76 wears by an amount that equals to the clearance gap 58, the inner edge 70 of the second strip 90 will be exposed and contact the shaft 18 to close the second circuit. As configured, part of the first strip 88 will wear along with the second seal lip 76.

In one example, when the second circuit involving the second strip 90 closes, an alarm or signal will sound to the alert the user or operator that the seal element 86 has worn a sufficient amount equal to the clearance gap 58 and that seal failure due to wear is impending. This allows the operator time to safely schedule repair and/or maintenance of the operating equipment and not have to do so during seal failure or during seal leak.

Figure 4C:
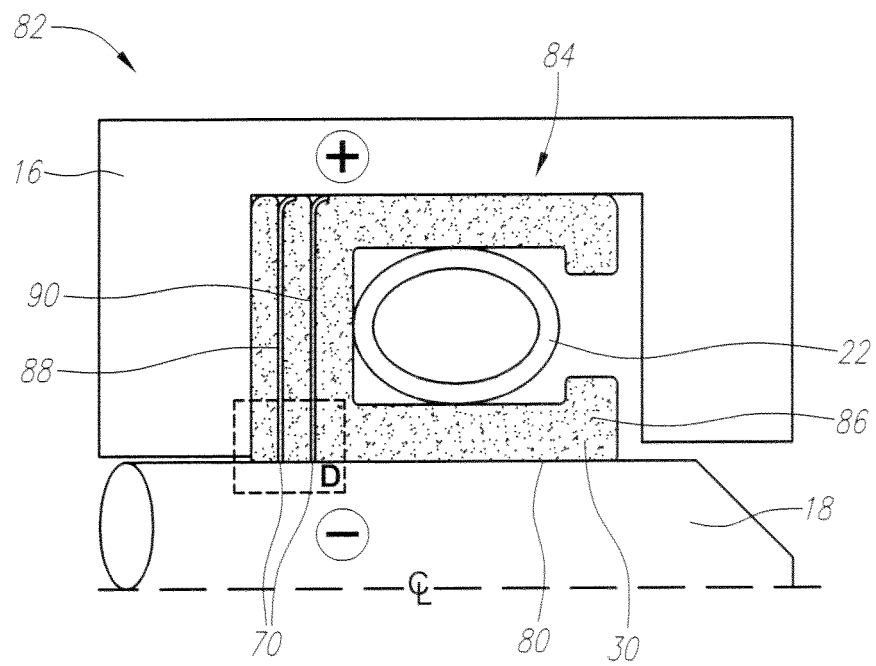
FIG. 4C is a cross-sectional view of the system of FIG. 4 shown in a partially worn state.

FIG. 4C illustrates a cross section of the seal failure prediction system 82 of FIG. 4. The seal failure prediction system 82 is shown with the seal element 86 in its near failure condition, i.e., worn, but still seals against the shaft 18. The seal against the shaft 18 is still maintained due, at least in part, to the spring 22 biasing the inner flange 30 and the worn seal edge 80 against the shaft 18. In this configuration or state, the inner perimeters 70 of the two strips 88, 90 now contact the shaft 18. With the first circuit involving the first strip 88 already in contact with the shaft 18 and the second circuit involving the second strip 90 now contacting the shaft after the seal wears a sufficient amount, the sequential completion of circuits may be configured to perform a number of functions. For example, the first circuit may indicate that the system is in service while the second circuit may be used to sound an alarm, which can be either visual or audible. The second circuit may also be used as a redundant system and signals a warning only when both circuits are closed.

Figure 4D:
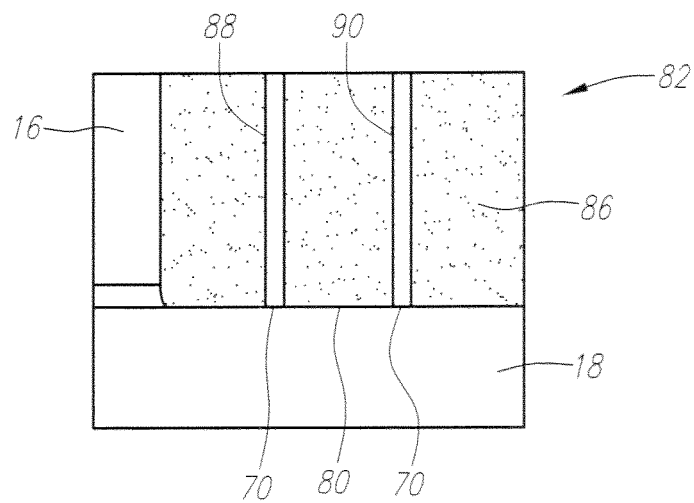
FIG. 4D is an exploded view of a seal section of FIG. 4C.

FIG. 4D shows an enlarged view of the area of the seal lip 80 and the inner perimeters 70 of the first and second strips 88, 90 of FIG. 4C. As shown, both strip 88, 90 are shown in contact with the shaft 18.

Figure 5:
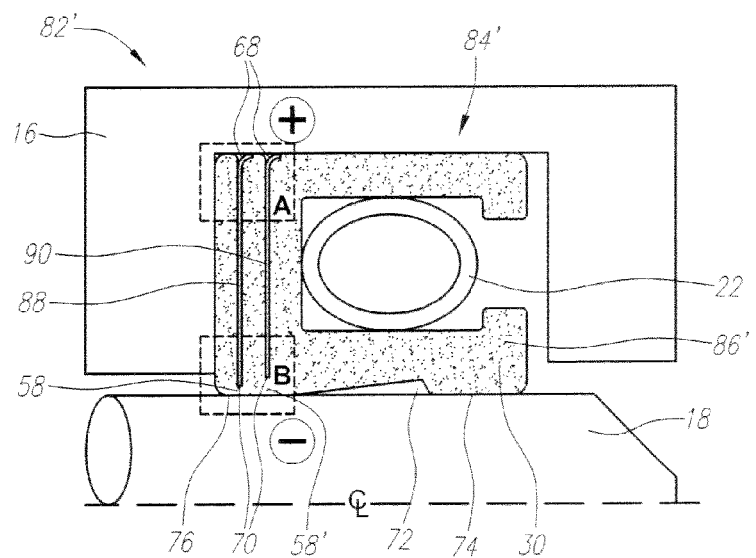
FIG. 5 is a cross-sectional view of a seal failure detection or prediction system mounted over a shaft according to alternative aspects of the present disclosure.

FIG. 5 shows a cross section of a seal failure prediction system 82' provided in accordance with alternative aspects of the present disclosure. The present system 82' is similar to the system 82 of FIG. 4 and comprises a seal assembly 84' mounted directly to a housing 16 without a backup ring. The seal assembly 84' comprises a seal element 86' comprising a first detection, contact, or warning strip 88 and a second detection, contact or warning strip 90 embedded directly into the seal element 86', similar to the embodiment of FIGS. 2-4. As shown, the outer perimeters or edges 68 of both strips 88, 90 are pressed against the housing 16 and appropriately shaped to ensure effective electrical contacts between the outer edges 68 and the housing 16. Along the inside adjacent the shaft 18, the inner edge 70 of the first strip 88 is embedded within the second seal lip 76 and spaced from the shaft 18 by an operating or clearance gap 58.

Also shown in FIG. 5 is the inner edge 70 of the second strip 90 being embedded but located completely within the inside flange 30 of the seal element 86', which has a curved or recessed edge 72 separating the inside flange 30 into a first seal lip section 74 and a second seal lip section 76. The inner edge 70 of the second strip 90 is spaced from the shaft by a second operating gap 58'. Thus, if the housing 16 represents a positive terminal and the shaft 18 a negative terminal, the first circuit involving the first contact 88 is configured to form a first closed circuit when the seal lip 76 wears an amount that equals the first operating gap 58. When the seal element 86' further wears a total amount equals to the second operating gap 58', a second circuit involving the second strip 90 closes.

Figure 5A:
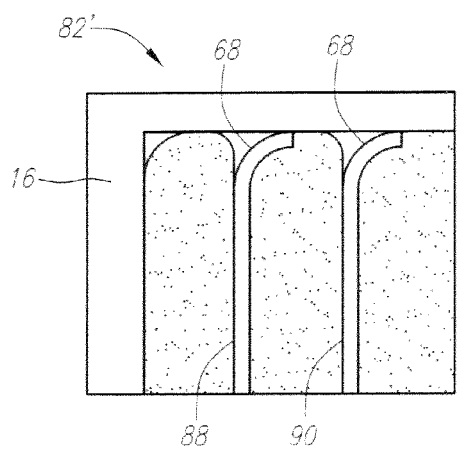
FIGS. 5A and 5B are exploded views of seal sections of FIG. 5.
Figure 5B:
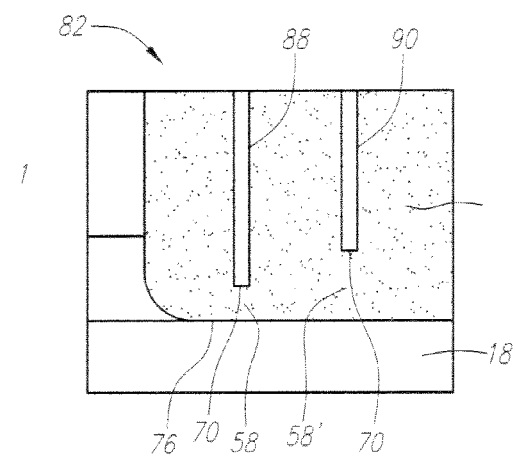

FIG. 5A and FIG. 5B are enlarged views of the outer edges 68 and the inner edges 70 of the two strips 88, 90 of FIG. 5, respectively. As clearly shown in FIG. 5A, the outer edges 68 are curved to ensure good electrical contacts with the housing 16. Along the inside of the seal shown in FIG. 5B, the inner edge 70 of the first strip 88 is embedded in the inner flange 30 of the seal element 86' and has a first clearance gap 58 and is spaced from the shaft 18. The inner edge 70 of the second strip 90 is shown spaced from the shaft 18 by a second clearance gap or second working gap 58', which is greater or thicker than the first working gap. In an alternative embodiment, the first working gap 58 is greater or thicker than the second working gap 58'. The working gaps 58, 58' in the present embodiment represents different thicknesses of the seal element 86' at the second seal lip section 76. When the thickness of the second seal lip 76 wears by an amount that equals the first clearance gap 58, the inner edge 70 of the first strip 88 will be exposed and contact the shaft 18 to close the first circuit involving the first strip 88. When the thickness of the second seal lip 76 wears an additional amount that equals to the second clearance gap 58', the inner edge 70 of the second strip 90 will be exposed and contact the shaft 18 to close the second circuit involving the second strip 90.

Figure 5C:
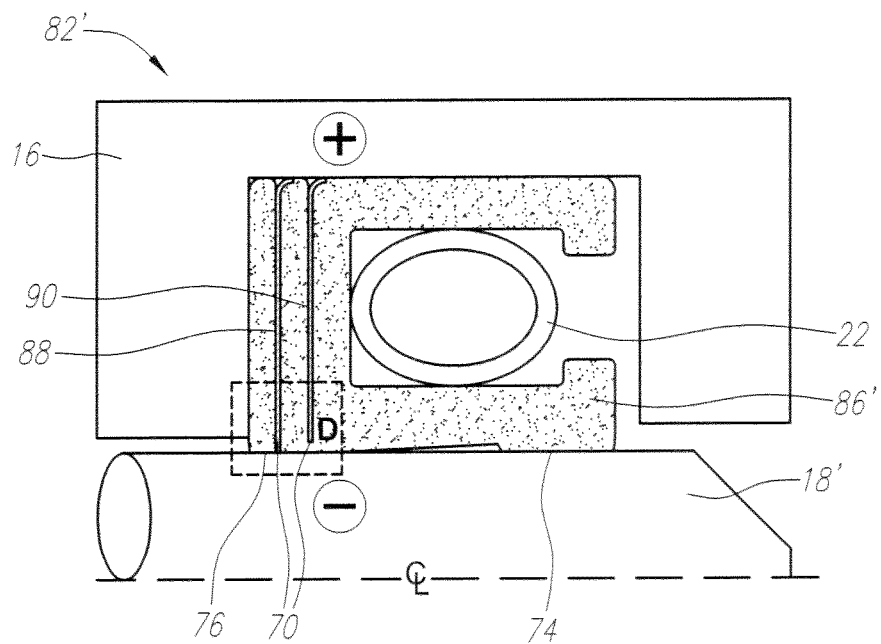
FIG. 5C is a cross-sectional view of the system of FIG. 5 shown in a partially worn state.
Figure 5D:
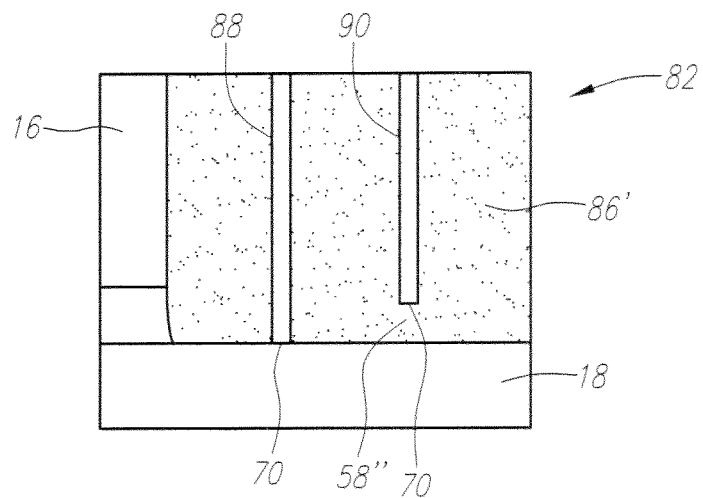
FIG. 5D is an exploded view of a seal section of FIG. 5C.

FIG. 5C is a cross-sectional view of the detection system 82' of FIG. 5, which shows the inner seal lip 76 partially worn by amount that equals the first clearance gap 58. As shown in FIG. 5D, which is an exploded view of the inner edges 70 of the first and second strips 88, 90 of FIG. 5C, the inner edge 70 of the first contact strip 88 is now in contact with the shaft 18 and closes the electrical circuit between the housing 16 and the shaft 18. As the second clearance gap 58' is partially worn at this stage, the clearance gap between the inner edge 70 of the second contact strip 90 and the shaft is now equivalent to a third clearance gap 58", which is smaller or less than the second clearance gap 58' due to the wear of the first gap 58. The closing of the first circuit involving the first contact strip 88, the housing 16, and the shaft 18 may be tied or connected to an alarm system configured to alert a user or operator that the seal assembly 84' has partially worn to a first level or stage but seal wear is still within acceptable limit as the second alarm involving the second strip 90 has not triggered. In some examples, the two strips 88, 90 may be tied to a tracking system to monitor the speed of seal wear. For example, the time elapse until the first circuit closes and the time elapse until the second circuit closes may be monitored. The tracking may also be tied to an event, such as during equipment startups, during peak operation, during a surge, during a change in flow, etc.

Figure 5E:
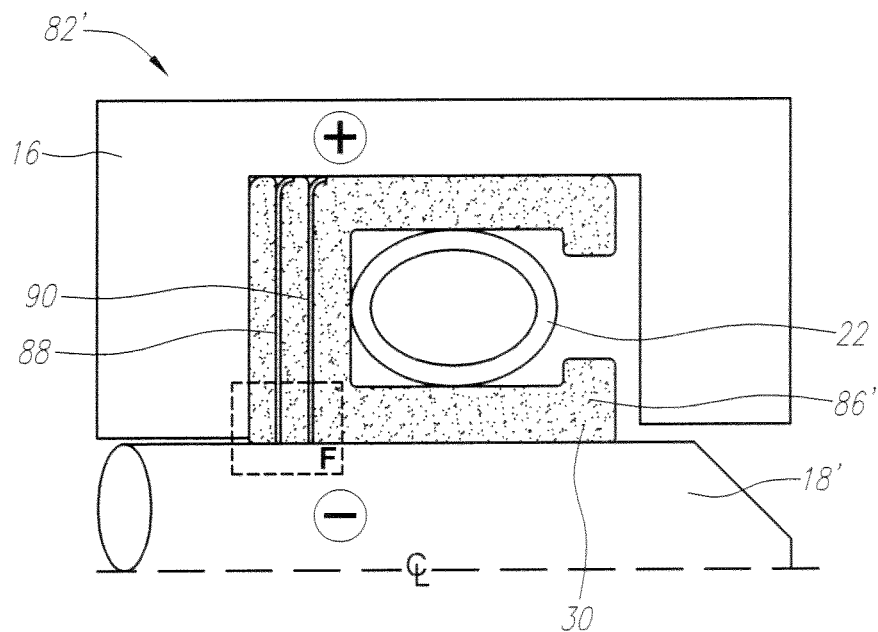
FIG. 5E is across-sectional view of the system of FIG. 5 shown in a further partially worn state.
Figure 5F:
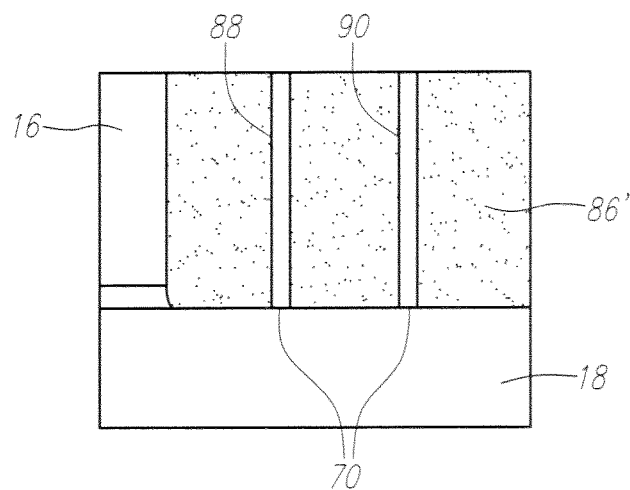
FIG. 5F is an exploded view of a seal section of FIG. 5E.

FIG. 5E is a cross-sectional view of the detection system 82' of FIG. 5, which shows further wear on the inner seal lip 76 by amount that equals the third clearance gap 58", or by an amount that totals the thickness of the second clearance gap 58'. As shown in FIG. 5F, which is an exploded view of the inner edges 70 of the first and second strips 88, 90 of FIG. 5E, the inner edges 70 of the first contact strip 88 and of the second contact strip 90 are now in contact with the shaft 18 and the electrical circuits between the housing 16 and the shaft 18 of the first circuit involving the first strip 88 and the second circuit involving the second strip 90 are both closed.

Figure 6:
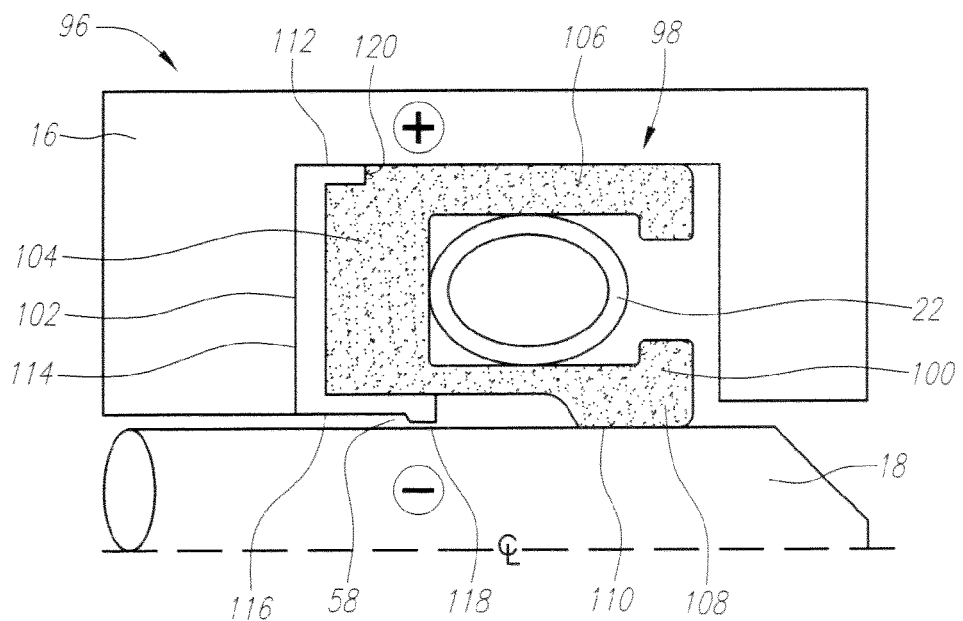
FIG. 6 is a cross-sectional view of a seal failure detection or prediction system mounted over a shaft according to alternative aspects of the present disclosure.

FIG. 6 shows a cross section of a seal failure prediction system 96 provided in accordance with alternative aspects of the present disclosure. The present system 96 comprises a seal assembly 98 mounted directly to a housing 16 without a retainer ring (not shown), which may optionally be incorporated. The seal assembly 98 comprises a seal element 100 comprising a detection, contact, or warning ring 102 placed in abutting contact with the center channel section 104 of the seal element 100, which also has an outer extending flange 106 and an inner extending flange 108 having a seal lip 110 for sealing against the shaft 18. In one example, the contact ring 102 embodies an annular ring having an outer flange 112 defining an outer perimeter, a center channel section 114, and an inner flange 116 defining an inner perimeter for accommodating the shaft. The inner flange 116 further comprises a contract lip or inner edge 118, which is normally spaced apart from the surface of the shaft 18 by a gap 58 when the seal element is un-worn. As shown, the inner and outer flanges 112, 116 of the contact ring 102 engage the center channel section 104 of the seal element 100, which has a shoulder 120 to recess the outer flange 112 of the contact ring relative to the outer contour of the seal element to facilitate a uniform contact with the housing 16, such as to ensure solid contact between the outer flange 112 and the housing 16.

Along the inside adjacent the shaft 18, the inner edge 118 of the contact ring 102 is spaced from the shaft 18. Thus, in the un-worn state shown in FIG. 6, there is no electrical communication between the housing and the shaft.

Figure 6A:
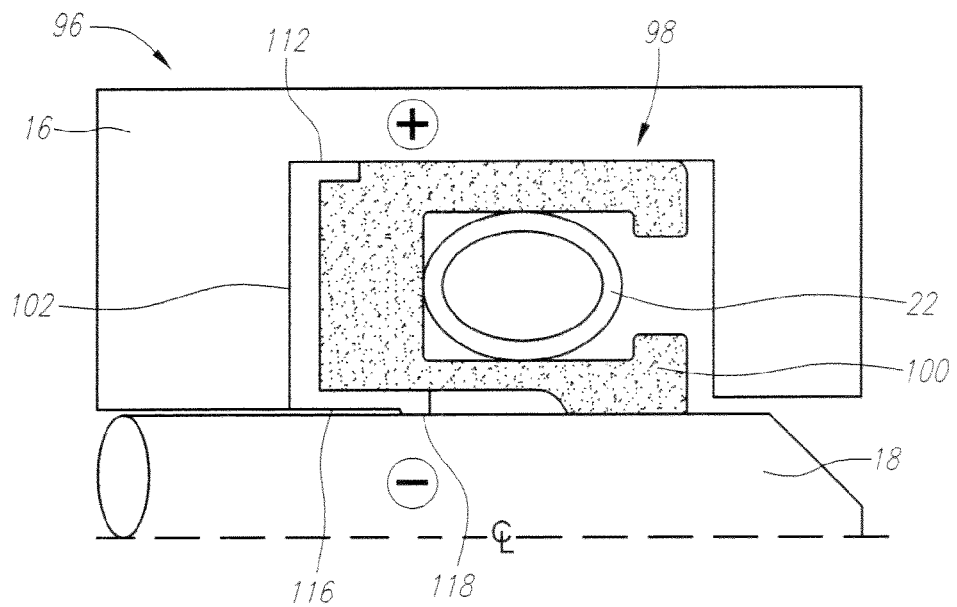
FIG. 6A is across-sectional view of the system of FIG. 6 shown in a partially worn state.

FIG. 6A shows a cross section of the seal failure prediction system 96 of FIG. 6 with the seal lip 110 slightly worn to the point that the clearance gap 58 now disappears. At this point, the contact lip 118 now contacts the shaft 18 to close the circuit between the housing, the contact ring, and the shaft. The circuit may be connected to an alarm system, such as to a light, an audible alarm, or other warning signals for alerting the operator of the seal wear and impending seal failure. This in turn allows maintenance to be scheduled rather than having to do the repair to the seal assembly as an emergency following seal failure.

Figure 7:
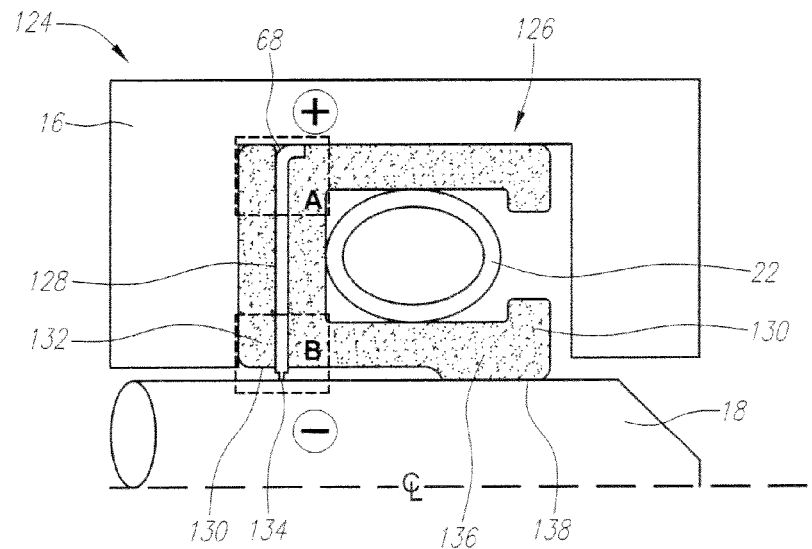
FIG. 7 is a cross-sectional view of a seal failure detection or prediction system mounted over a shaft according to alternative aspects of the present disclosure.

FIG. 7 shows a cross section of a seal failure prediction system 124 provided in accordance with alternative aspects of the present disclosure. The present system 124 has many features that are similar with the system 60 of FIG. 2. Thus, unless the context indicates otherwise, only features that differ will be emphasized herein.

The system 124 comprises a seal assembly 126 mounted directly to a housing 16 without a backup ring. The seal assembly 126 comprises a detection, contact, or warning strip 128 that is embedded directly into the seal element 130. For example, the warning strip 128 may be co-molded with the seal element 130 with the seal element being made from an elastomeric material such as silicone, Buna N, nitrile, fluorosilicones, PTFE, elastomers, etc. In another embodiment, a torroid shape backup ring (not shown) may be placed between the housing 16 and the seal element 130 to resist extrusion from the high pressure region to the low pressure region.

As shown, the outer perimeter or edge 68 of the strip 128 is pressed against the housing 16 and appropriately shaped to ensure an effective electrical contact between the outer edge 68 and the housing. Along the inside adjacent the shaft 18, the inner edge 130 of the strip 128 has a variable cross-section, which comprises a main strip section 132 and a terminal strip section 134, which has a different diameter or dimension than the main strip section 132. As shown, the terminal strip section 134 is reduced from the main strip section, i.e., has a smaller cross-sectional dimension. In one example, the terminal strip section 134 is exposed, such as not being embedded in the inner flange section of the seal element 130. In another example, the exposed terminal strip 134 is in contact with the shaft in the seal un-worn state. In another example, the variable cross-section contact strip is not in contact with the shaft in the seal un-worn state. As shown in FIG. 7B, the terminal strip section 134 is in contact with the shaft 18 in the seal un-worn state. The variable width strip can permit different current to pass therethrough when the smaller terminal strip section 134 contacts the shaft compared to when the terminal strip is worn and the larger diameter section contacts the shaft. This in turn allows an operator or user to track where or at what state of seal wear by monitoring different signal strengths passing through the circuit.

Figure 7A:
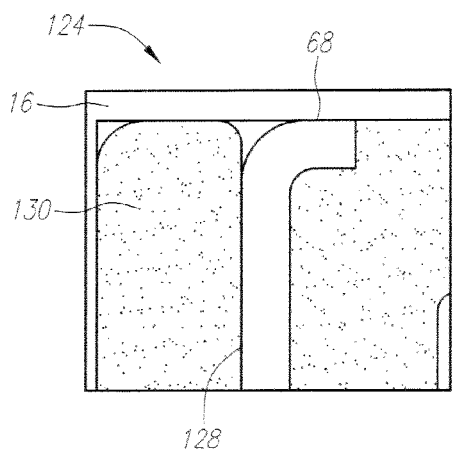
FIGS. 7A and 7B are exploded views of seal sections of FIG. 7.
Figure 7B:
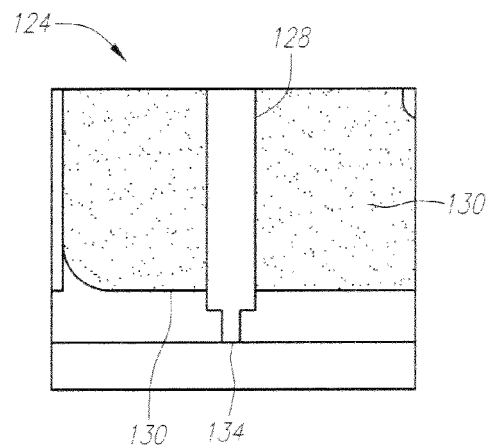

FIG. 7A is an enlarged view of the outer edge 68 of the variable cross-section contact strip 128. As shown, the outer edge 68 is curved to ensure good electrical contact with the housing 16.

Figure 7C:
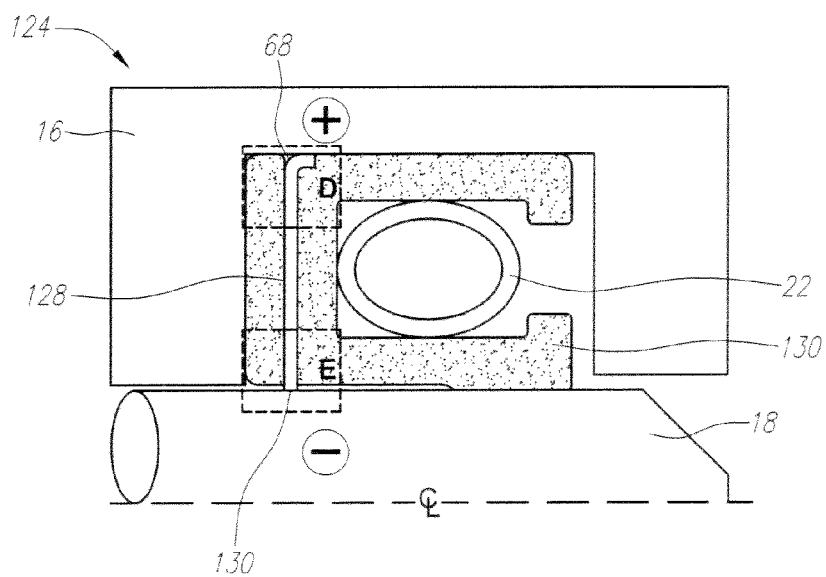
FIG. 7C is a cross-sectional view of the system of FIG. 7 shown in a partially worn state.

FIG. 7C illustrates a cross section of the seal failure prediction system 124 of FIG. 7. The seal failure prediction system 124 is shown with the seal element 130 in its near failure condition, i.e., worn, but still seals against the shaft 18. The seal against the shaft 18 is still maintained due, at least in part, to the spring 22 biasing the inner flange 136 and the seal lip 138 against the shaft. As the seal wears during use, the terminal contact section 134 also wears so that the larger diameter main section 132 of the strip 128 now contacts the shaft. Thus, not only is the strip 128 variable in size, current flow through the strip 128 is also variable from when the terminal strip section 134 is present versus when it disappears due to wear. In this configuration or state, the inner perimeter or edge 130 of the strip 128 now contacts the shaft 18 with its main section 132. If the strip 128 functions as a switch, the wearing on the terminal tip section 134 and the seal lip 138 decrease resistance through the strip 128 as the remaining strip material is not reduced by the smaller terminal strip section 134.

Figure 7D:
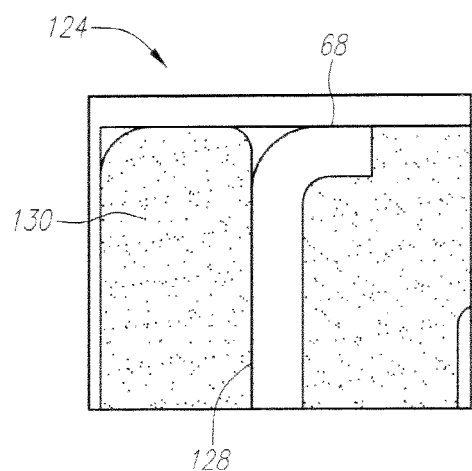
FIGS. 7D and 7E are exploded views of seal sections of FIG. 7C.
Figure 7E:
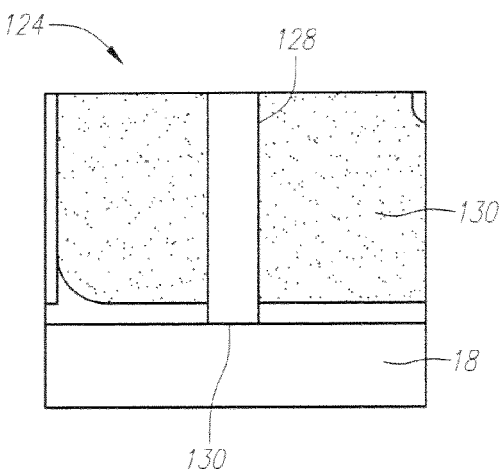

FIG. 7D shows an enlarged view of the area of outer edge 68 of the contact strip 128 contacting the housing and FIG. 7E shows the inner edge 130 of the seal lip contacting the shaft 18 with the terminal strip section 134 (FIG. 7) being worn away during use.

Figure 8:
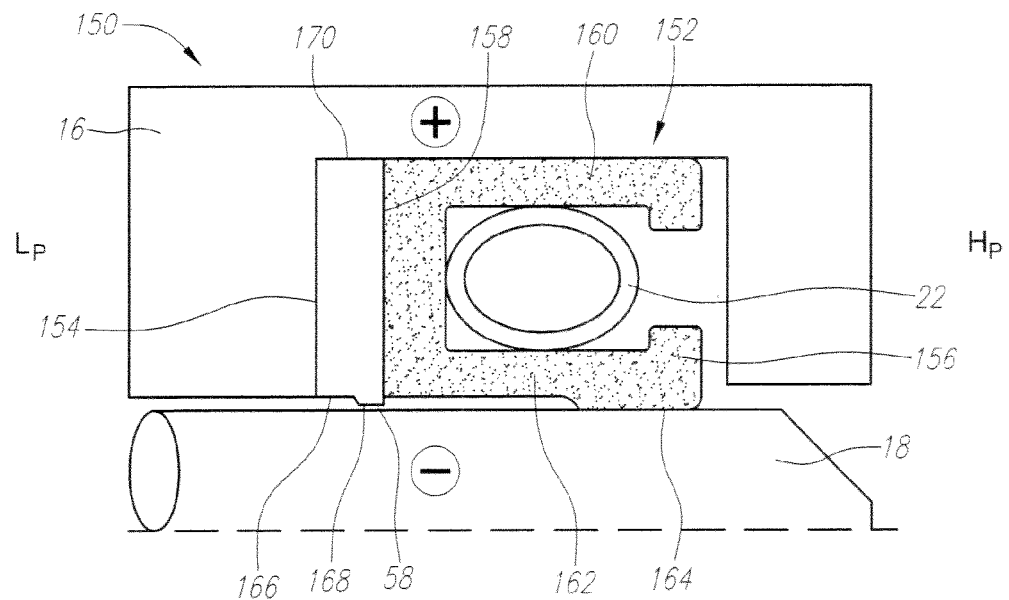
FIG. 8 is a cross-sectional view of a seal failure detection or prediction system mounted over a shaft according to alternative aspects of the present disclosure.

FIG. 8 shows a cross section of a seal failure prediction system 150 provided in accordance with alternative aspects of the present disclosure. The present system 150 comprises a seal assembly 152 mounted directly to a housing 16 without a retainer ring (not shown), which may optionally be incorporated. The seal assembly 152 comprises a seal element 156 and a back-up ring 154, which also functions as a detection, contact, or warning ring placed in abutting contact with the center channel section 158 of the seal element 156, which also has an outer extending flange 160 and an inner extending flange 162 having a seal lip 164 for sealing against the shaft 18. In other words, the ring 154 is a combination back-up element and a current or signal carrying strip. In one example, the back-up ring 155 embodies a generally planar plate having a central opening 166 for accommodating the shaft 18 and a contact lip 168 for making electrical contact with the shaft when the seal lip 164 wears from use. The back-up ring 154 is therefore understood to be made from an electrically conductive material and optionally has a highly conductive metal cladding to improve electrical transmission, such as a layer of copper or copper alloy. The back-up ring 154 is sufficiently thick and rigid to resist extrusion when pressure from the high pressure region $H_P$ acts on the seal element and pushes it towards the low pressure region $L_P$. As shown, the contact lip 168 is spaced from the shaft but the outer perimeter 170 of the back-up ring 154 is in abutting contact with the housing as well as the entire length of the back-up ring being in abutting contact with the housing.

Figure 8A:
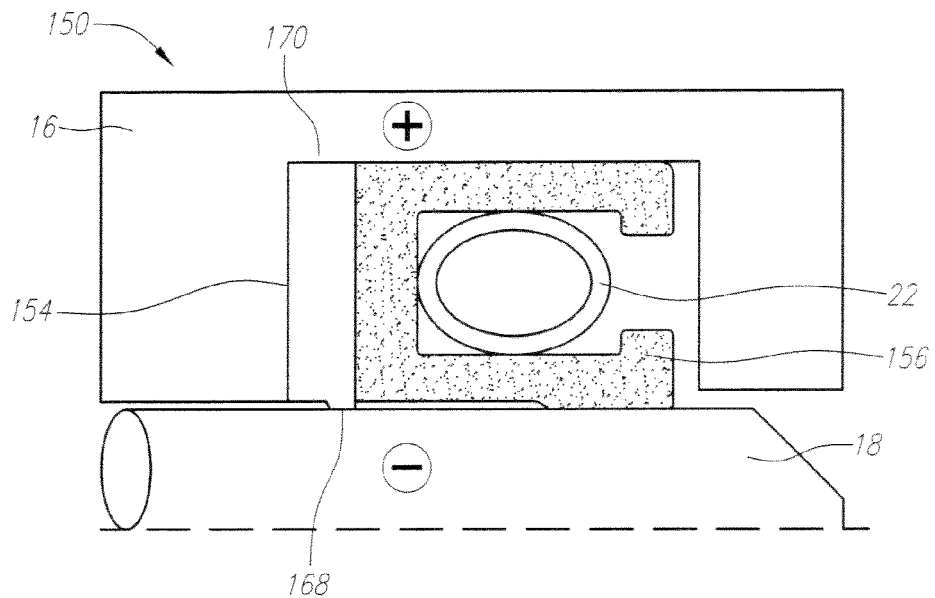
FIG. 8A is a cross-sectional view of the system of FIG. 8 shown in a partially worn state.

FIG. 8A shows a cross section of the seal failure prediction system 150 of FIG. 8 with the seal lip 164 slightly worn to the point that the clearance gap 58 is now gone. At this point, the contact lip 168 of the back-up ring contacts the shaft 18 to close the circuit between the housing, the back-up ring 154, and the shaft. The circuit may be connected to an alarm system, such as to a light, an audible alarm, or other warning signals for alerting the operator of the seal wear and impending seal failure. This in turn allows maintenance to be scheduled rather than having to do the repair to the seal assembly as an emergency following seal failure. In the embodiments discussed herein and elsewhere, the contact strip, contact ring, or back-up ring that functions as a contact strip may also produce a local audible alarm when the moving shaft scrapes against the edge of the strip or the contact ring.

The apparatus, system, and method of the present disclosure are therefore understood to include a seal failure prediction system comprising or consisting of a sealing component providing sealing against a first component and an electrically conductive member that is in contact with a second component; such electrically conductive member becoming a conductive path between the said first and second components when the sealing component reaches a certain amount of wear.

A further feature of the present apparatus, system, and method include a seal failure prediction system where the first and second components are disposed concentrically. In some embodiments, at least two of the components are in contact along a flat surface. In certain sealing applications, the first and second components are understood to be cylindrical. However, in other embodiments, the first and second components can be semispherical.

Another aspect of the present disclosure is a seal failure prediction system comprising or consisting of a sealing component providing sealing against a first component and an electrically conductive member that is in contact with the first component and a second component; such electrically conductive member being a conductive path between the first and second components that is modified when the sealing component reaches a certain amount of wear. In some examples, the conductive path and associated current flow are modified by a second electrically conductive member or an increase in the contact area of the electrically, conductive member when the sealing component reaches a certain amount of wear.

Still further features of the present device, system, and method include a seal failure prediction system comprising or consisting of a sealing component providing sealing against a first component and a member; this member being in contact with a second component, and an audible signal being generated due to friction between the member and first component when there is movement relative to one another and the sealing component reaches a certain amount of wear.

In some embodiments, the audible signal can be modified by a second member or an increase in the contact area of the member when the sealing component reaches a certain amount of wear.

The sealing component has a seal or seal element, which may be spring energized, and a back-up component. The sealing component can further include a strip of electrically conductive material located in between and acting as the electrically conductive member. In the initial non-worn condition of the sealing component, the electrically conductive strip being in electrical contact with the second component but not with the said first component. For example, the electrically conductive strip can be in contact with the housing but not with a shaft.

The seal failure prediction system can also include embedded contact strips. For example, a set of wires of electrically conductive material acting as the electrically conductive members can be embedded in the seal element and when the seal element is in its initial non-worn condition, the electrically conductive wires have different lengths and all being in electrical contact with the second component but not with the said first component.

In an alternative embodiment, the sealing component may be spring energized and only a subset of wires being in electrical contact with the said first component.

Yet, a still further feature of the present description is a seal failure prediction system having a spring energized seal, a back-up component, and a strip in between the two and acting as a detection member. In the initial non-worn condition of the sealing component, the strip is not in contact with the said first component but such first component and the strip member being capable of producing a perceptible audible signal when physically interacting with each other.

Although limited embodiments of seal failure prediction assemblies and systems and their components have been specifically described and illustrated herein, many modifications and variations will be apparent to those skilled in the art. For example, the various contact strips, seal elements, and back-up rings may incorporate different shapes, different materials, and different extensions, etc. Furthermore, it is understood and contemplated that features specifically discussed for one prediction system or device may be adopted for inclusion with another prediction embodiment or system, provided the functions are compatible. Accordingly, it is to be understood that the prediction assemblies and systems and their components constructed according to principles of the disclosed device, system, and method may be embodied other than as specifically described herein. The disclosure is also defined in the following claims.

What is claimed is:

1. A seal failure prediction system comprising:
   a seal element comprising an outer flange, a center channel section, and an inner flange comprising a seal lip having an inside diameter;
   a housing having the seal element disposed therein;
   an electrically conductive strip spaced from a shaft and disposed in or adjacent the center channel section of the seal element and the inner flange and having an outer perimeter exposed and in electrical communication with the housing and having an inner perimeter; and
   a canted coil spring disposed in a cavity defined by the inner and outer flanges and the center channel section of the seal element, and biasing the electrically conductive strip and the inner flange towards the shaft;
   wherein the outer perimeter of the strip contacts the housing and the inner perimeter of the strip is spaced from the shaft by a clearance gap and only contacts the shaft when the seal lip wears an amount sufficient to expose the inner perimeter of the strip.

2. The seal failure prediction system of claim 1, further comprising a back-up ring positioned in the housing.

3. The seal failure prediction system of claim 2, wherein the back-up ring is positioned in contact with the seal element.

4. The seal failure prediction system of claim 2, wherein the outer perimeter of the electrically conductive strip is curved over an edge of the seal element.

5. The seal failure prediction system of claim 2, wherein the electrically conductive strip is disposed between the seal element and the back-up ring and inside the inner flange.

6. The seal failure prediction system of claim 2, wherein the electrically conductive strip is located in the center channel section of the seal element.

7. The seal failure prediction system of claim 1, wherein the electrically conductive strip is a first electrically conductive strip, and further comprising a second electrically conductive strip spaced from the first electrically conductive strip.

8. The seal failure prediction system of claim 7, wherein the first electrically conductive strip has a length that is longer than the second electrically conductive strip.

9. The seal failure prediction system of claim 1, wherein the electrically conductive strip has a main strip section and a terminal strip section, the terminal strip section is reduced from the main strip section, the inner perimeter is the terminal strip section.

10. The seal failure prediction system of claim 1, further comprising a bearing for supporting the shaft.

11. The seal failure prediction system of claim 2, further comprising a retaining ring for securing the outer flange against the housing.

* * * * *

UNITED STATES PATENT AND TRADEMARK OFFICE
CERTIFICATE OF CORRECTION

PATENT NO. : 9,541,199 B2
APPLICATION NO. : 13/456143
DATED : January 10, 2017
INVENTOR(S) : Steve Rust It is certified that error appears in the above-identified patent and that said Letters Patent is hereby corrected as shown below:

In the Specification

In Column 2, Line 47, delete "elements" and insert -- element is --, therefor.

In Column 3, Line 13, delete "across-" and insert -- a cross- --, therefor.

In Column 3, Line 41, delete "FIG. 4:" and insert -- FIG. 4; --, therefor.

In Column 3, Line 53, delete "across-" and insert -- a cross- --, therefor.

In Column 3, Line 59, delete "across-" and insert -- a cross- --, therefor.

In Column 4, Line 25, after "As" insert -- denoted elsewhere herein, like element numbers are intended to indicate like or similar elements or features. --.

In Column 5, Line 1, delete "screw s" and insert -- screws --, therefor.

In Column 5, Line 23, delete "16" and insert -- 16, --, therefor.

In Column 5, Line 37, after "generally" insert -- "L" --.

In Column 6, Line 65, delete "silicone." and insert -- silicone, --, therefor.

In Column 7, Line 3, delete "torroid" and insert -- toroid --, therefor.

In Column 7, Line 35, delete "across" and insert -- a cross --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,541,199 B2

In Column 12, Line 18, delete "torroid" and insert -- toroid --, therefor.

In Column 12, Lines 44-45, delete "allow s" and insert -- allows --, therefor.

In Column 14, Line 14, delete "electrically," and insert -- electrically --, therefor.